United States Patent [19]
Parker

[11] Patent Number: 5,339,403
[45] Date of Patent: Aug. 16, 1994

[54] ACCESS CONTROL IN A DISTRIBUTED COMPUTER SYSTEM

[75] Inventor: Thomas A. Parker, Calne, United Kingdom

[73] Assignee: International Computers Limited, Putney, England

[21] Appl. No.: 42,441

[22] Filed: Apr. 5, 1993

Related U.S. Application Data

[63] Continuation of Ser. No. 694,462, May 1, 1991, abandoned.

[30] Foreign Application Priority Data

May 11, 1990 [GB] United Kingdom ............... 9010603
Jul. 9, 1990 [GB] United Kingdom ............... 9015104

[51] Int. Cl.5 .................................................. G06F 9/00
[52] U.S. Cl. ............................ 395/425; 380/21; 380/25; 364/DIG. 2; 364/969; 364/969.3; 364/969.4
[58] Field of Search ............... 395/725, 425, 325, 275, 395/600; 380/21, 18, 10, 25, 23

[56] References Cited

U.S. PATENT DOCUMENTS

| | | | |
|---|---|---|---|
| 4,017,839 | 4/1977 | Calle et al. ............... | 395/275 |
| 4,064,494 | 9/1989 | Kobus, Jr. ............... | 395/575 |
| 4,177,510 | 12/1979 | Appell et al. ............ | 395/425 |
| 4,211,393 | 3/1989 | Hazard .................... | 380/21 |
| 4,442,484 | 4/1984 | Childs, Jr. et al. ...... | 395/425 |
| 4,644,493 | 2/1987 | Chandra et al. ........ | 380/4 |
| 4,757,533 | 7/1988 | Allen et al. ............. | 380/25 |
| 4,817,140 | 3/1989 | Chandra et al. ........ | 380/4 |
| 4,916,738 | 4/1990 | Chandra et al. ........ | 380/25 |
| 4,919,545 | 4/1990 | Yu ........................... | 380/25 |
| 4,962,531 | 10/1990 | Sipman et al. .......... | 380/24 |
| 4,980,912 | 12/1990 | Welmer ................... | 380/10 |
| 5,003,595 | 3/1991 | Collins et al. ........... | 380/25 |
| 5,043,878 | 8/1991 | Ooi .......................... | 395/375 |
| 5,065,429 | 11/1991 | Lang ........................ | 380/25 |
| 5,091,902 | 2/1992 | Chopping et al. ...... | 370/16.1 |
| 5,113,442 | 5/1992 | Moir ........................ | 380/25 |
| 5,127,099 | 6/1992 | Zifferer et al. .......... | 395/725 |
| 5,140,684 | 8/1992 | Sakamura et al. ..... | 395/425 |
| 5,146,575 | 9/1992 | Nolan, Jr. ............... | 395/425 |
| 5,157,777 | 10/1992 | Lai et al. ................. | 395/425 |
| 5,191,611 | 3/1993 | Lang ........................ | 380/25 |

OTHER PUBLICATIONS

Lu, et al, "Secure Communication in Internet Environments: A Hierarchical Key Management Scheme for End-to-End Eneryption", IEEE Transactions on Communications, vol. 37, No. 10, Oct. 1989, pp. 1014-1023.

"Method For Managing Client/Server Relationships In The AIX Operating System", IBM Tech. Disc. Bulletin, vol. 31, No. 8; Jan. 1989.

*Primary Examiner*—Allen R. MacDonald
*Assistant Examiner*—Ayaz R. Sheikh
*Attorney, Agent, or Firm*—Lee, Mann, Smith, McWilliams, Sweeney & Ohlson

[57] ABSTRACT

A distributed computer system, has a number of users and target applications. When a user logs on to the system, an authentication unit issues the user with a privilege attribute certificate (PAC) representing the user's access rights. When the user wishes to access a target application, he presents the PAC to that application as evidence of his access rights. The application, in turn, passes the PAC to a PAC use monitor (PUM) which validates the PAC. The PUM is shared between a plurality of applications.

3 Claims, 3 Drawing Sheets

ACCESS CONTROL IN A DISTRIBUTED COMPUTER SYSTEM

This application is a continuation of application Ser. No. 694,462, filed May 1, 1991, abandoned.

BACKGROUND TO THE INVENTION

This invention relates to a method and apparatus for controlling access by users to applications programs in a distributed computer system.

A framework for security in a distributed computer system has been proposed by the European Computer Manufacturers' Association (ECMA) and is described in the following references.
1) ECMA TR/46 "Security in Open Systems—a Security Framework" July 1988
2) ECMA standard ECMA/138 December 1989
3) "Network Access Control Development", COM-PACS 90 Conference, London, March 1990

The ECMA security framework permits a user to be authenticated to the system, and to obtain as a result a data package referred to as a privilege attribute certificate (PAC) which represents a certified collection of access rights. When the user wishes to access a target application, the user presents the PAC to that application as evidence of the user's access rights.

An advantage of this approach is that the user does not need to be authenticated separately to individual applications—the authentication procedure is performed once only, to obtain the PAC. The PAC can then be used several times to access different applications.

The object of the present invention is to build on this idea of using PACs, to provide an improved method of access control.

SUMMARY OF THE INVENTION

According to the invention there is provided a distributed computer system capable of supporting a plurality of users and a plurality of applications, the system including an authentication unit for authenticating a user and issuing that user with a privilege attribute certificate (PAC) which can then be presented to an application by the user as evidence of the user's access rights, characterised by a validation unit, common to a plurality of applications, for validating PACs received by those applications to determine whether the users that presented those PACs are permitted to access those applications.

DESCRIPTION OF AN EMBODIMENT OF THE INVENTION

One distributed computer system embodying the invention will now be described by way of example with reference to the accompanying drawings.

Figure 1:
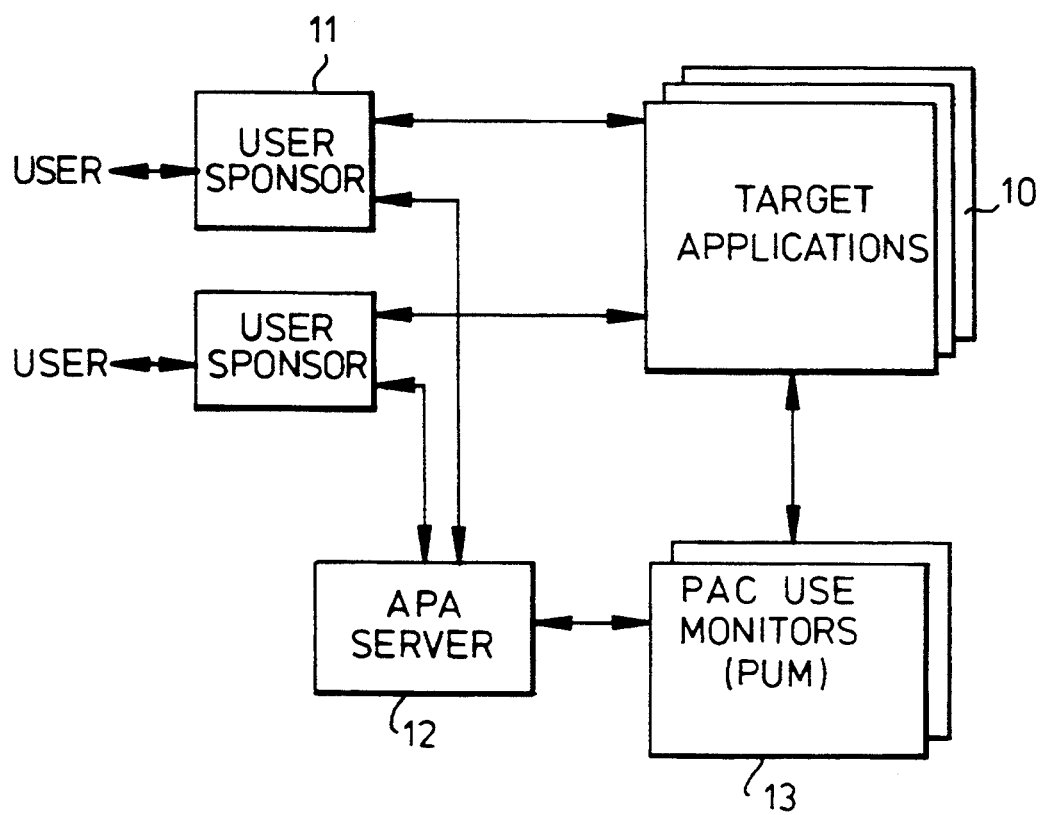
FIG. 1 is a schematic diagram of a distributed computer system embodying the invention.

Referring to FIG. 1, the system comprises a number of target applications 10. For example, a target application may be a database program, or an electronic mail program.

Human users interface with the system by way of user sponsors 11. Each user sponsor is a software module which acts as the representative for a user in all activities within the system. In particular, it represents the user in establishing the user's rights to access the target applications.

The user sponsors 11 communicate with an authentication and privilege attribute server (APA server) 12, which provides an authentication service for the system. The APA server provides each authenticated user with a privilege attribute certificate (PAC) representing the user's access rights within the system. The user sponsor can then use the PAC to access the target applications. The target applications themselves may require to perform accesses to further applications on behalf of the user. To authorise these accesses, they may need to pass on the user's PAC, as if they themselves were user sponsors. As will be described, the ability of a target application to re-use a PAC is controlled, to prevent insecure applications from using PACs in an improper way.

The system also includes at least one PAC Use Monitor (PUM) 13. In this example, there are several PUMs in the system. The PUMs provide a service to the target applications by validating the PACs when requested, so as to determine whether a particular user has the right to access a particular target application.

Where there are several PUMs in the system they may be divided into a number of groups, according to the degree of trustworthiness of the PUM. For example, the PUMs may be divided into two groups: a trusted group and a less trusted group. As will be described, the user may then specify which group of PUMs he wishes to validate a particular PAC, according to the degree of security required by the user for that PAC.

Figure 2:
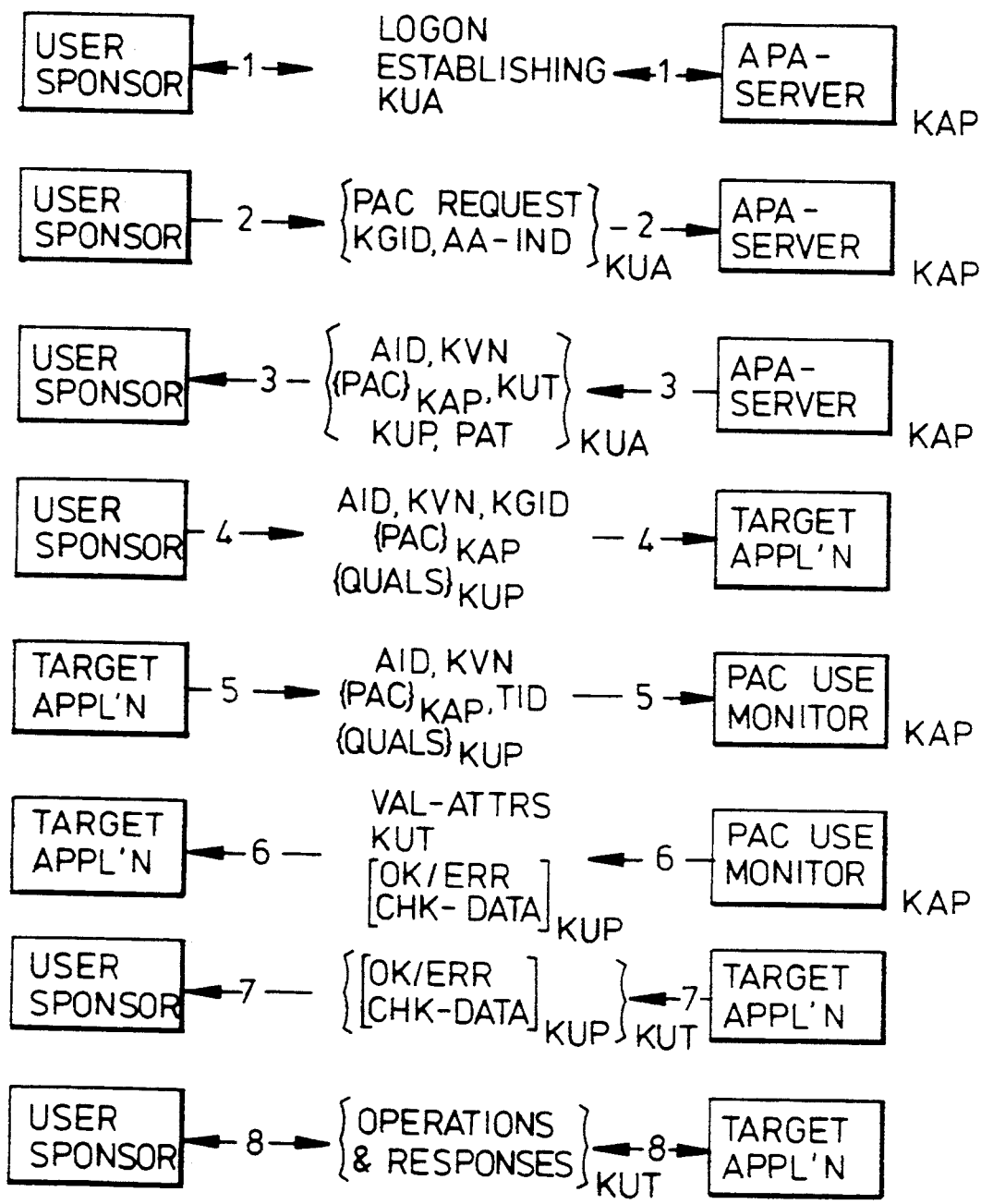
FIG. 2 is a sequence diagram showing the steps in the protocol for connecting a user to a target application.

The protocol for connecting a user to a target application will now be described with reference to FIG. 2. The numbering of the steps below corresponds to the numbering of the data exchanges shown in that figure.

In the drawing, square brackets are used to indicate cryptographic integrity sealing, for providing tamper detection. Round brackets denote encryption for confidentiality. Curly brackets are used to indicate that the data is both sealed and encrypted. In each case the encryption key is indicated by a subscript. For example, $$\{PAC\}_{KAP}$$

indicates that PAC is sealed and encrypted under the key KAP.

1) The user logs on to the APA server via his user sponsor. This may involve a conventional log-on procedure which will not be described herein. This procedure generates a cryptographic key KUA, unique to the user, which is used for subsequent exchanges between the user sponsor and the APA server.

2) The user sponsor requests a PAC. The user may specify, by means of a group identifier KGID, the group of PUMs by which the PAC is required to be validated. The user may also specify, by means of an indicator flag AA-IND, whether he requires the target application for which this PAC is to be used to be authenticated. The request, KGID, and AA-IND are all encrypted under the key KUA.

3) When the APA server receives the PAC request, it checks the user's access rights. These depend on the user's status in the system (e.g. his job in the organisation, his security clearance, etc). The APA server then returns to the user sponsor, under the protection of the key KUA, a package of information containing the following:

AID: The identity of the ASA server

KVN: The version number of the key KAP (see below)

KUT: A pseudo-randomly generated key for use in communication between the user sponsor and the target application KUP: A pseudo-randomly generated key for use in communications between the user sponsor and the PUM ${PAC}_{KAP}$: A copy of the privilege attribute certificate (PAC), representing the user's access rights as determined by the APA server. This is sealed and encrypted under KAP, a predetermined key which is known to the APA server and to the PUMs in the group specified by KGID. All the PUMs in the same group share the same key KAP, while different groups have different keys KAP.

PAT: Attribute data extracted from the privilege attribute certificate.

The contents of the PAC are as follows:

Attr: The access privilege attributes of the user

PAC-tgt-Qual: Constraints imposed by the ASA server on target applications for which the PAC is valid KUT: A copy of the key KUT KUP: A copy of the key KUP PAC-Expiry: The expiry time of the PAC 4) The user may now select a target application he wishes to access. The user sponsor connects to this application and passes to it AID, KVN, KGID, and the sealed and encrypted PAC, as obtained from the ASA server. The user sponsor also creates a qualifier token Quals for the PAC, and passes this to the target application, under protection of the key KUP. Quals contain one or more PAC Qualifiers, each containing the following information:

PACID: The unique identity of the PAC to which the qualifier relates

Tgt-Qual: Constraints on the permissible application(s) for which the PAC is valid for use with this qualifier. These constraints may be a subset of those that appear in the PAC itself Attr-Qual: The subset of privilege attributes which are to be valid from this PAC for use with this qualifier. Note that the PAC may contain attributes which constrain the minimum as well as the maximum bounds for this choice.

Q-Expiry: Expiry information determining the time window within which the PAC must be validated with this qualifier.

QID: An identifier for this qualifier.

Count: The number of times this qualifier may be submitted for successful validation of its PAC 5) The target application now identifies which PUM it is required to use to validate the PAC, as specified by the value of KGID (if any) supplied by the user sponsor. The target application passes to this PUM all the information just received from the user sponsor, together with an indication TID of the identity of the target application.

When the PUM receives this information, it performs the following actions.

First the PUM examines the target application identity TID, and determines whether or not it is willing to validate a PAC from this particular application.

Assuming that the PUM is willing to validate this PAC, it now uses the values of AID and KVN to determine which key KAP to use. It then uses this key to decrypt and integrity check the PAC.

The PUM then uses the key KUP (obtained from the decrypted PAC) to decrypt and integrity check the qualifier token Quals. As mentioned above, Quals consist of one or more qualifiers. the PUM performs the following actions in respect of each of these qualifiers in turn.

Check that the PACID in the qualifier is the same as the PACID in the PAC itself. If not, ignore this Qualifier and start again on the next one.

Check that the Qualifier has not already been used the maximum permitted number of times. If it has, ignore this Qualifier and start again on the next one.

For the purpose of this check, the combination of PACID and QID is used to index a count table containing a count of the number of times each such combination has been validated. If there is no existing entry, then an entry is created and set to 1 to indicate that this is the first time. Otherwise the contents of the entry are incremented and compared with the permitted maximum value count (obtained from the Qualifier). If the result exceeds the Qualifier count then the Qualifier is already used up.

Check that Tgt-Qual in the Qualifier matches the attributes of the target application in question, as identified by the TID. If this fails, abandon checking and return a validation failure.

Check the value in Q-Expiry to ensure that the Qualifier has not expired. If this fails, abandon checking and return a validation failure.

If all of the checks succeed then validation is successful for the Qualifier being checked.

6) The PUM returns the following information:

KUT: If validation succeeded, the key that the application is to use with the user sponsor.

Val-Attrs: If validation succeeded, the privilege attributes that the user possesses for this use of the target application, along with any other control information that may be in the PAC and the application may need to know (such as audit information).

OK/Err: Indication of the success or otherwise of the validation. This, together with Chk-Data described below is sealed under KUP.

Chk-Data: Data which gives details of the validation that has been undertaken. It contains the following information:

i) PACID, the identity of the checked PAC ii) TID, the attributes claimed by the application iii) T-Checked, the time at which the PAC was validated iv) The QID of the qualifier used v) Auth-Ind, which indicates whether the application's claimed TID was authenticated.

vi) C-Rem, the count value remaining unused for this Qualifier.

7) The target application replies to the user sponsor with the sealed success or failure indication from the PUM together with the Chk-Data, both protected under KUT.

8) The user sponsor may now start performing operations and obtaining responses from the target application under the protection of KUT.

Figure 3:
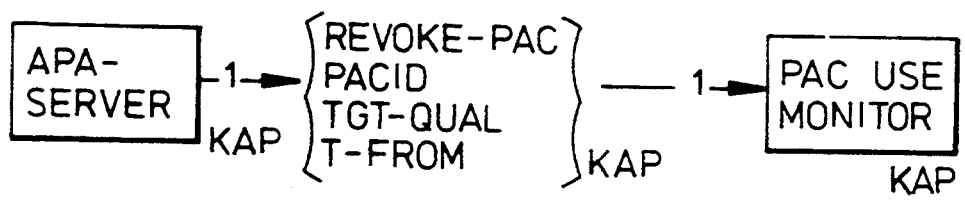
FIG. 3 is a sequence diagram showing the protocol for revoking access rights.

Referring now to FIG. 3, this shows the way in which the APA server can revoke a PAC.

The APA server sends a Revoke-PAC message directly to each PUM in the system, the message containing the identity PACID of the PAC to be revoked. The revocation may be qualified by specifying the particular targets for which the PAC is to be revoked, and the time from which the revocation is to be effective.

Discussion

It can be seen that the access control technique described above does not require the use of any asymmetric cryptographic functions. It requires each target application to access a PUM to arbitrate on the validity of a PAC. The PUM can be very simple and fast, and contains no long-term data except a cryptographic key and the names (and possibly attributes) of the applications it is willing to service. The PUMs therefore require minimal management, and the provision of a plurality of PUMs does not present any consistency problems. A particular PUM can be co-located with its client applications. Alternatively, a PUM for use by applications running on a relatively insecure system can be provided at a separate and more secure location.

Moreover, the system provides for immediate PAC revocation since the APA server can contact each PUM directly to revoke a specified PAC.

The parameter TGt-Qual in the qualifier permits a user to specify for which target applications the PAC is to be valid. The user's choice can be constrained by the APA server.

Moreover, the parameters QID and Count in the qualifiers allow the user to prevent a PAC from being used with a particular Qualifier more than a nominated number of times. This enables the user to restrict further use of the PAC by the target application. In particular, if the user specifies that the PAC is to be used only once, then it is not possible for the target application to re-use the PAC to access other applications. Furthermore, the parameter Q-expiry in the qualifier allows the user sponsor to impose a time span, shorter than the PAC expiry time, within which the PAC must be used by the target application. This allows PACs with life spans as long as the whole user session to be issued safely by the APA server, while allowing the user sponsor to limit use of the PAC by the target application.

The system requires no long-term storage of cryptographic keys in the user sponsor. Moreover, it ensures that the user sponsor that was issued the PAC is the one which subsequently controls its repeated use.

The only cryptographic keys in the system that have to be stored on a long-term basis are the keys KAP. The others are all generated dynamically when required.

Some Possible Modifications

It will be appreciated that many modifications can be made to the system described above without departing from the scope of the present invention.

For example, cryptographic protection may be provided over the links between the target applications and the PUM. Alternatively, the cryptographic protection under the key KUT between the user sponsors and one or more of the target applications may be removed. This avoids the need for any cryptographic functionality in those target applications.

Figure 4:
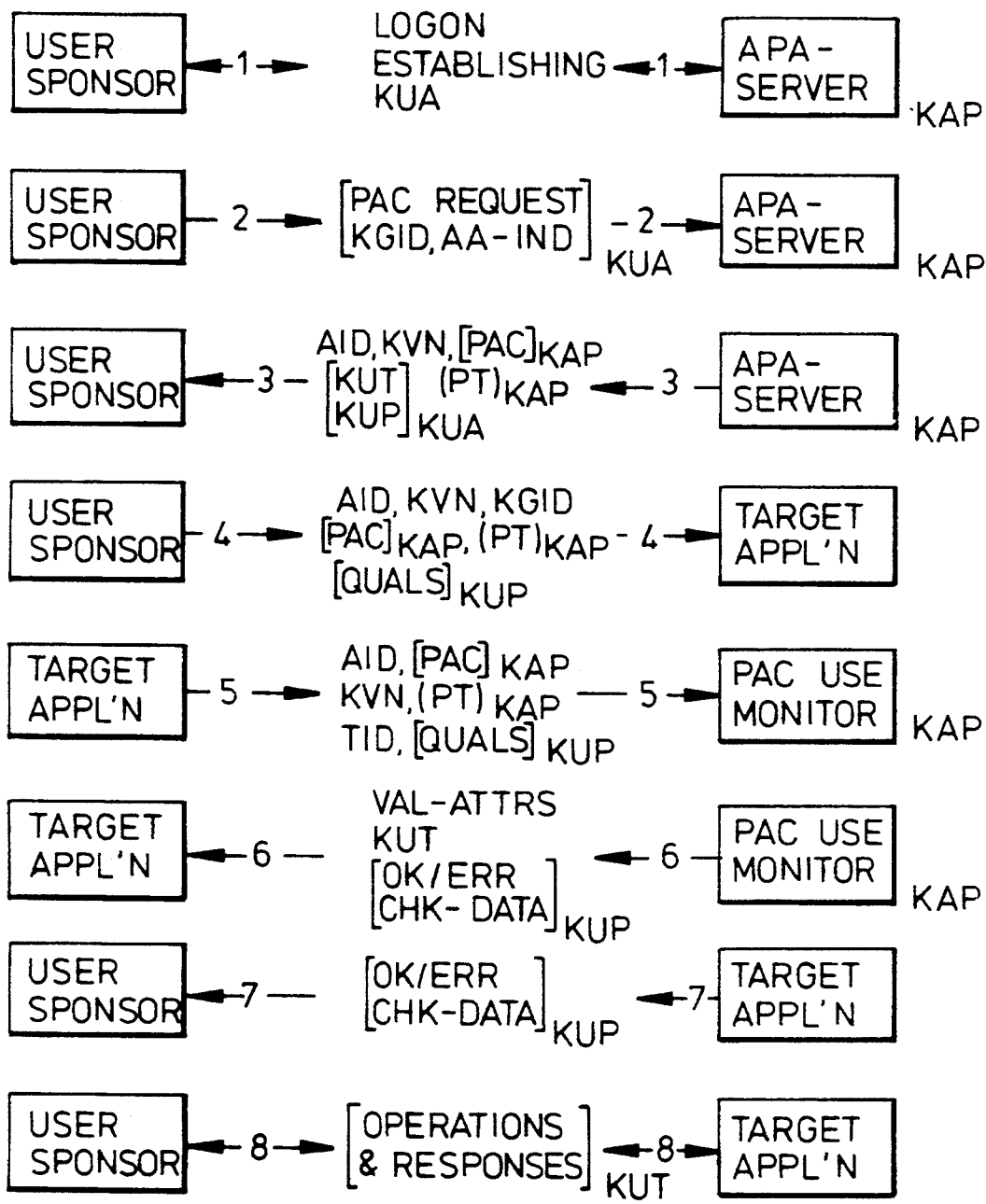
FIG. 4 shows a modification of the protocol.

A number of national governments will permit for general use only those cryptographic schemes in which the uses of encryption to hide data are minimised. This in practice requires that only cryptographic keys may be transmitted in encrypted form. The variation shown in FIG. 4 is an adaptation of the system intended to satisfy these government requirements.

The variation introduces a PAC Token (PT) which now carries the confidential information that in the previously described scheme was carried in the PAC. The PT consists of the keys KUP and KUT, linked to the PAC by means of PACID, and is encrypted under the key KAP. The PAC token PT is the only information transmitted in encrypted form. Other information is cryptographically sealed, as indicated by the square brackets, to provide tamper detection without being encrypted. The adapted protocol is otherwise self-explanatory in the Figure.

I claim:

1. In a distributed computer system, a method of controlling access from a user program to a plurality of target programs, the method comprising the steps:
    (a) issuing said user program with an encrypted privilege attribute certificate (PAC), said PAC indicating which of said target programs the user program is permitted to access,
    (b) transmitting the encrypted PAC from the user program to one of the target programs,
    (c) transmitting the encrypted PAC from said one of the target programs to a validation unit,
    (d) in the validation unit, decrypting the encrypted PAC and checking whether the PAC permits the user program to access said one of the target programs,
    (e) returning a message from the validation unit to said one of the target programs, indicating whether the user program is permitted to access said one of the target programs, and
    (f) returning a success/failure indication from said one of the target programs to said user program indicating whether the user program is permitted to access said one of the target programs.

2. The method according to claim 1 wherein each PAC contains a cryptographic key, and wherein the validation unit, when it determines that the user program is permitted to access said one of the target programs, supplies said cryptographic key to said one of the target programs for use in communicating with the user program.

3. The method according to claim 1 wherein each PAC has a PAC qualifier associated with it, and wherein the validation unit permits a PAC with a particular PAC qualifier to be used to gain access to a target program up to a maximum number of times as specified by a count value in the PAC qualifier.

* * * * *